(12) United States Patent
Zhuk (10) Patent No.: US 7,774,751 B2
(45) Date of Patent: Aug. 10, 2010

(54) KNOWLEDGE-DRIVEN ARCHITECTURE

(76) Inventor: Yefim Zhuk, 11191 E. Ida Pl., Englewood, CO (US) 80111

( * ) Notice: Subject to any disclaimer, the term of this patent is extended or adjusted under 35 U.S.C. 154(b) by 858 days.

(21) Appl. No.: 10/709,460

(22) Filed: May 6, 2004

(65) Prior Publication Data
US 2005/0149558 A1 Jul. 7, 2005

Related U.S. Application Data

(60) Provisional application No. 60/532,384, filed on Dec. 26, 2003.

(51) Int. Cl.
*G06F 9/44* (2006.01)
(52) U.S. Cl. .................. 717/120; 717/107; 717/114; 717/139; 707/706
(58) Field of Classification Search .............. 707/706; 717/107, 114, 120, 139
See application file for complete search history.

(56) References Cited

U.S. PATENT DOCUMENTS

| | | | | |
|---|---|---|---|---|
| 5,297,150 | A * | 3/1994 | Clark | 714/26 |
| 2002/0104067 | A1* | 8/2002 | Green et al. | 717/101 |
| 2002/0169658 | A1* | 11/2002 | Adler | 705/10 |
| 2003/0007000 | A1* | 1/2003 | Carlson et al. | 345/713 |
| 2004/0123272 | A1* | 6/2004 | Bailey et al. | 717/125 |
| 2008/0010459 | A1* | 1/2008 | Knoll et al. | 713/176 |

OTHER PUBLICATIONS

Bellissard et al., Proceedings of the 16th ICDCS, pp. 579-585, 1996.*
Vazirgiannis et al., Lecture Notes in Computer Science; vol. 1045, Proceedings of the European Workshop on Interactive Distributed Systems and Services, pp. 71-89, 1996.*
Lee et al, Proceedings of the IEEE, vol. 89, No. 1, pp. 41-57, 2001.*
Jasper, R. and Uschold, M. (1999), 'A framework for understanding and classifying ontology applications', in 'Twelfth Workshop on Knowledge Acquisition Modeling and Management KAW'99'. pp. 1-20.*
Leff et al., Fifth IEEE International Enterprise Distributed Object Computing Conference Web-Application Development Using the Model/View/Controller Design Pattern, Seattle, Washington Sep. 4-Sep. 7, 2001, pp. 118-127.*

* cited by examiner

*Primary Examiner*—Cheyne D Ly (57) ABSTRACT

Traditional control systems are first designed by subject matter experts that create business rules and scenarios. Then, the systems are developed by system developers, people who translate business rules and scenarios into technology. The invention allows business rules and scenarios to be directly included in a control system and via the Scenario Player and other components directly drive the controlling services, providing for knowledge-driven architecture control systems. These systems can easily adjust its controlling behavior, improving flexibility to a variety of control systems including but not limited to video and audio systems, distributed networks and their combinations for medical, military and transportation applications. This description is not intended to be a complete description of, or limit the scope of, the invention.

11 Claims, 5 Drawing Sheets

Knowledge-Driven Architecture

Fig. 1 Knowledge-Driven Architecture

Fig. 2 Presenter and Knowledgebase Components

Fig. 3 Collaboration Diagram

Fig.4 Service Connector

Fig. 5 Scenario Player

KNOWLEDGE-DRIVEN ARCHITECTURE

CROSS REFERENCE To RELATED APPLICATIONS

The present application is based on the Applicant's U.S. Provisional Patent Application #60532384, entitled "Knowledge-driven Architecture," filed on Dec. 29, 2003.

BACKGROUND OF INVENTION

1. Field of the Invention

The present invention relates generally to the field of software architecture. More specifically, the present invention discloses a method that integrates software and knowledge engineering in knowledge-driven architecture. The method allows developers or business experts to quickly build a software application layer by describing application flow as a set of scenarios and introducing application requirements as related business rules in a knowledgebase. An Application Scenario Player and a Service Connector transform application scenarios into interactions with the knowledgebase, presentation components and underlying application services.

2. Background

There is a gap in the current development process between the initial business input provided by business experts and the final implementation. The current process requires multiple transformations from user requirements into low-level programming functions and data tables. Multiple technology teams work hard to create multiple filter-layers to fill this gap and break the beautiful shapes of reality into small and simplistic pieces, transforming business rules into Boolean logics.

This process hasn't changed much during the last twenty years.

Some time ago, we thought of the C-language as a language for application development, while Assembly was the language for system development. Since the Assembly language was pushed down to the system level, we use languages like C, C++, C#, VB, and Java to code business algorithms in applications. This development paradigm has been in place for about 20 years.

However, the current shift to service-oriented architectures and recent advances in knowledge technologies can allow us to cleanly separate generic services from application-level business rules and specific requirements of user-program or program-program interfaces.

Using a knowledgebase, we can represent requirements as business rules described in "almost natural" language. We can finally shift our focus from ironing out all possible business cases in our design and code to creating flexible application mechanisms that allow us to change and introduce new business rules on-the-fly.

We can also improve the pattern recognition process. Imagine that a set of rules which defines a recognition process, for example in a grammar file, is enhanced with the ability to access a knowledge engine. This would promise more intelligent recognition, based not only on the multiple choices prepared in the file, but also on existing facts and rules of the available world of knowledge, associations between related topics, etc.

Software applications often represent a new combination of existing software components. These components often need to be polished or changed to fit into a new application mosaic. Service components are glued and compiled together with specific business rules, expressed as programming algorithms, that distinguish the application.

Creating an application is a project, often a big project, for multiple teams; the initial team of business experts that know "what should be done" is just the tip of the iceberg. This invention can improve the development process by decreasing the transformation steps required, and thus stop the business requirements from getting watered down and distorted during the process.

SUMMARY OF INVENTION

The invention provides a better separation between generic service components and specific rules and scenarios that characterize the application. Services in a knowledge-driven architecture are integration-ready components presented at the service layer locally or distributed over the network. Business rules and scenarios that represent a very light application layer can be created and changed at run-time by business experts, who would have their chance to influence application behavior, and to say not only "what should be done," but also "how".

The main component of the application is the knowledgebase, which stores application requirements as application scenarios and business rules. The Application Scenario Player and the Service Connector transform application scenarios into interactions with the knowledgebase, presentation components, and underlying application services.

Knowledge-driven architecture includes elements and mechanisms that provide information about the knowledge and services existing on distributed knowledge systems built with this architecture.

These mechanisms and the collaborative mechanisms described in the Distributed Active Knowledge and Process Base (see Jeff Zhuk, U.S. patent application, Distributed active knowledge and process base, 2010044827, A1, http://uspto.gov) allow separate systems to negotiate multiple forms of collaboration: to share or trade knowledge and services with sufficiently flexible levels of security.

BRIEF DESCRIPTION OF DRAWINGS

The present invention can be more readily understood in conjunction with the accompanying drawings, in which.

DETAILED DESCRIPTION

Figure 1:
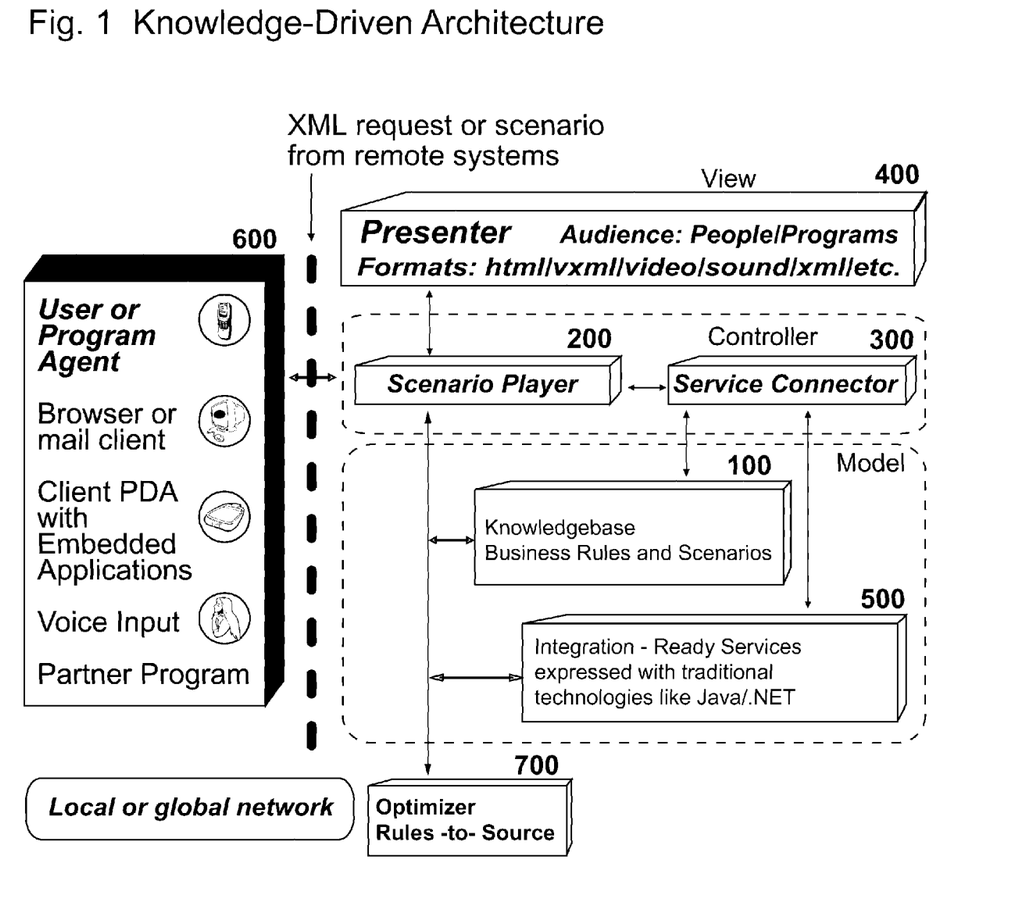
FIG. 1 is a diagram that shows the major blocks of knowledge-driven architecture.

FIG. 1

Turning to FIG. 1, the present invention consists of the knowledgebase 100 as the main component that collaborates with the application scenario player 200 and the service connector 300. The application scenario player 200 interprets application scenarios and interacts with the service connector 300 and presentation components 400. The service connector 300 provides access to the knowledgebase 100 and service components 500. This is the Functional View (or the Component View) of the architecture. Application requirements are directly represented by the business rules stored in the knowledgebase. A flow of application information as well as interactions between users and the program or/and between partner programs are described by application scenarios written with an XML based application scenario language (ASL).

We can review the diagram from the position of the Model-View-Controller Design Pattern. From this point of view, the knowledgebase with business rules and scenarios, together with application service components, represent the Model. The presentation components represent the View. The Scenario Player 200 and the Service Connector 300 represent the Controller.

The major component of the Model is the knowledgebase or Knowledge Engine (KE) 100. Business rules are captured in the knowledgebase with an "almost natural" ontology language like CycL. A user or program agent 600 can also transmit an application scenario to the controller. Application scenarios are written in the Application Scenario Language. The Application Scenario Language allows developers or business experts to describe application flow as a set of scenario acts with conditional service invocations. The scenario acts can describe interactions between users and programs or between partner programs engaged in a common business transaction, and include calls to knowledgebase services for application business rules and related data.

Traditional services, which are written with current programming languages like C# or Java and compiled into binary service components, can also capture some business rules and algorithms to support the Model. Services are designed as integration-ready components with separate APIs required by the Service Connector 300. The Service Connector 300 transforms service requests from application scenario acts into direct calls to service components 500.

Each application scenario is a set of scenario acts. Each act is a very lightweight XML description that can invoke some services, exercise conditions or business rules, and include rules for the interpretation of expected user or program agent responses.

There is a traditional View block of the MVC design pattern. The View delivers information in selected video, sound, or electronic formats; people as well as partner programs are its target audience. In the future, we will refer to presentation components or the View as the Presenter 400.

The Scenario Player 200 is connected via the Service Connector 300 to the knowledgebase 100 and other services 500 that represent a business model, and actively uses the knowledgebase 100 in the process of application scenario interpretation.

The input information for the Scenario Player 200 can be data entered by a user via voice or any other method, an XML service request from the network, or an act of an application scenario. The Scenario Player 200 interacts with the Service Connector 300 that provides access to the knowledgebase 100 and traditional services 500, as well as to the Presenter 400, which transforms resulting data into the proper format. The format depends on two factors. A specific implementation of the Presenter 400 that gears towards specific video, audio, or electronic formats is a fixed factor. An application scenario can include some presentation definition-rules that provide extra flexibility for the presentation layer.

The Scenario Player 200 is also responsible for the interpretation of service or knowledgebase responses. Interpreted responses are directed to the Presenter 400, which performs the final transformational steps and delivers data to the target audience in the selected presentation format.

The Presenter 400 can include special engines, like speech, handwriting, or image recognition, which might target a specific type of user input.

Scenarios can describe sequences of expected events related to multiple agents 600, and provide rules on handling these events. These scenarios will map each expected event to its observer object, or a set of observers that have interest in the events and handle them with the proper services 500.

The functionality described above provides for great flexibility, but can suffer in performance. The Optimizer 700 takes a snapshot of existing rules and scenarios and translates them into source, for example in Java or C#. This source can later be compiled into binary code to iron the current status of application rules into a regular application that lacks flexibility but provides better performance.

Figure 2:
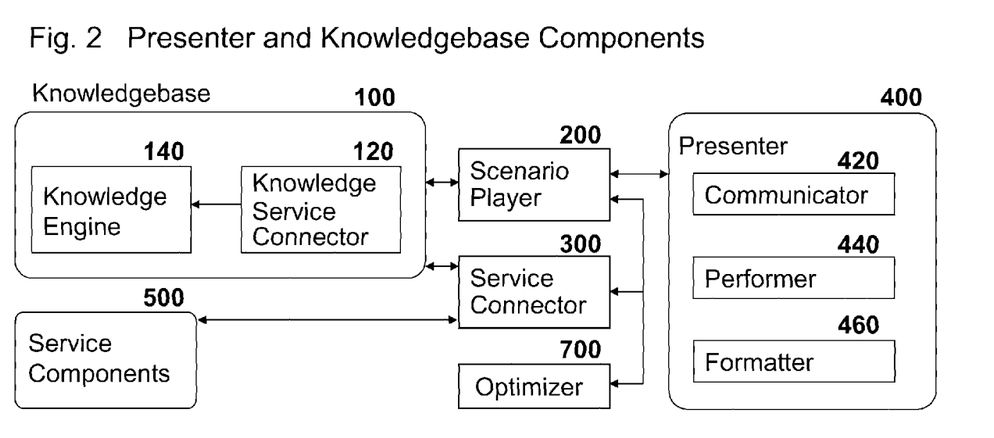
FIG. 2 shows details of the Presenter and knowledgebase components

FIG. 2

FIG. 2 shows details of the Presenter 400 and knowledgebase 100 components.

The Presenter 400 can include the Communicator 420, the Performer 440, and the Formatter 460 components.

The Formatter 460 prepares data for audio or video interaction or for communication to other programs. HTML is an example of such formatting. The Performer 440 component uses formatted data for actual presentation via voice or screen. The Performer 440 can be implemented in multiple ways for different client device types. For example, the Performer 440 can display HTML data via the rich graphical interface of a thick client device or workstation.

The Communicator 420 is responsible for formatted data communications via peer-to-peer distributed networks or other protocols.

Knowledge and service elements can be distributed over the network, where they can promote their abilities and can be accessed via the Communicator 420 using the collaborative mechanisms described in the Distributed Active Knowledge and Process Base (see Jeff Zhuk, U.S. patent application, Distributed active knowledge and process base, 2010044827, A1, http://uspto.gov).

The knowledgebase 100 component includes the knowledge service component 120 and the knowledge engine 140.

The KnowledgeService 120 component serves as the adapter to the knowledge engine 140, and adapts the knowledge engine interface to the interface required by the Service Connector 200.

Figure 3:
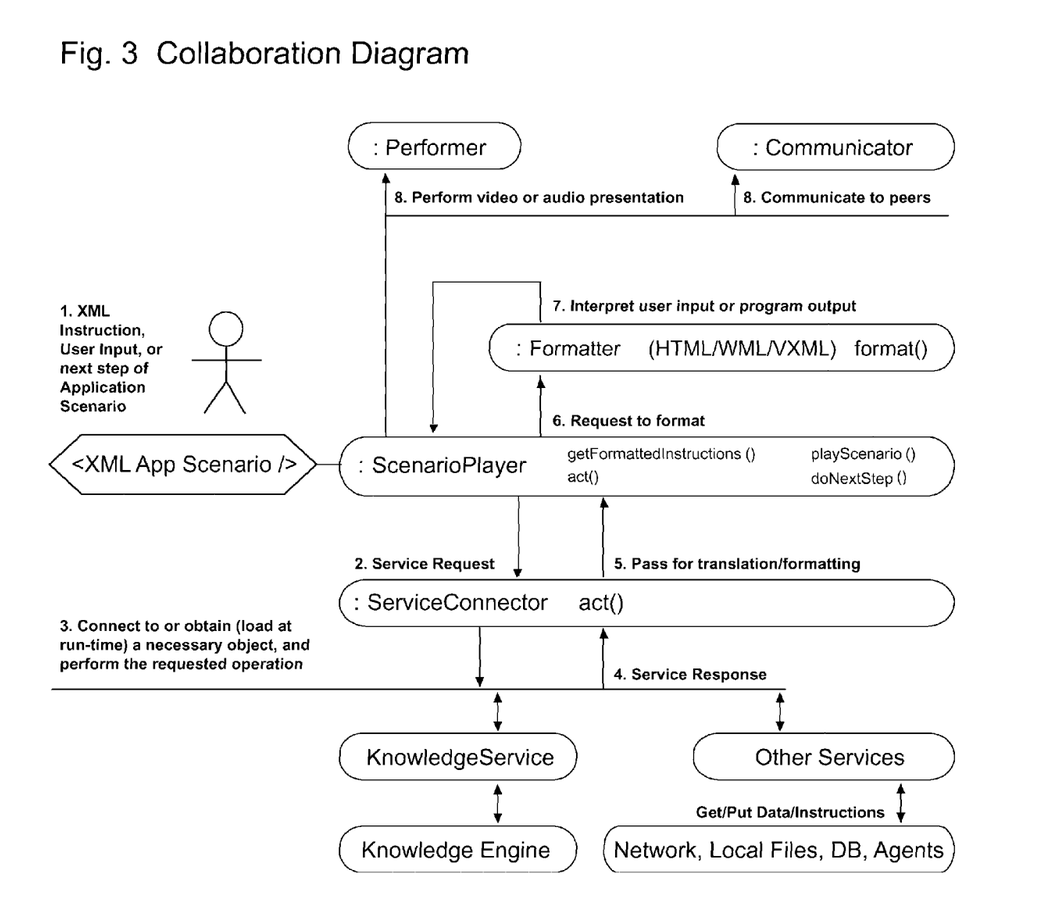
FIG. 3 is a collaboration diagram that describes the interaction between the components

FIG. 3

The collaboration diagram in FIG. 3 describes interaction between the components.

The diagram simplifies the activity of the application to 8 major steps.

The ScenarioPlayer object receives an XML instruction from the network, as an act of a current scenario, or a user's input related to the scenario.

The ScenarioPlayer interprets this input and translates it into a service request directed to the ServiceConnector (the most common action).

The ServiceConnector object uses its act( ) method to connect to or obtain (load at run-time) a necessary service object that will perform the requested operation/method.

The service object invokes the proper method with the necessary parameters, and delivers results back to the caller.

The ScenarioPlayer gets the results of the service, and passes them further to the Formatter object.

The Formatter implementation translates results into a presentation format and produces XML scenarios related to the expected user interaction.

The ScenarioPlayer interprets the results for the Performer object if the operation was a success. If the operation failed (for example, the knowledgebase query returns a "not found" string), the ScenarioPlayer can use the Communicator peer (if present) to outsource this operation to a network of knowledge peers.

The Performer object presents results on a screen or/and in a voice format. The alternative for this step is to communicate data to other peers (for example, if the local peer failed, another peer on the network may be able to resolve the request) or to partner programs.

Figure 4:
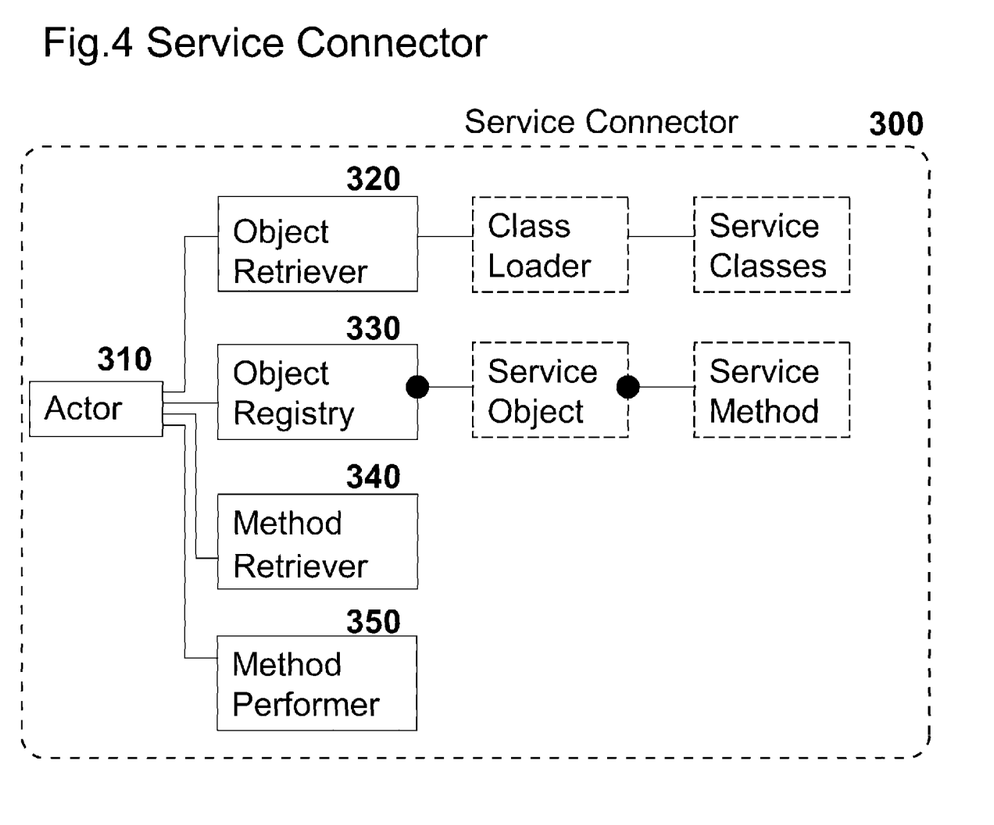
FIG. 4 illustrates details of the Service Connector component.

FIG. 4

FIG. 4 illustrates the details of the ServiceConnector component.

Each component in the figure represents a block of software responsible for the proper functionality of a component.

The Actor 310 block is able to play multiple object roles. It takes service and action names as parameters, and invokes the requested method on the requested object type.

The Actor 310 receives the name of the service and the name of the operation to perform with the required parameters. The Actor 310 looks into the Object Registry 330 to check if there is an existing object of the requested service class. If there is no such service object yet, the Actor 310 works with the Object Retriever 320 to load the requested service class and instantiate the object of this class at run-time. The Actor 310 then registers (stores) the retrieved object in the Object Registry 330.

Multiple objects of the same service class are associated with object names. In this case, the Service Connector 200 receives an object name as an additional argument to service and action names that identify the service class and the method names. The registered object keeps its state during its lifetime, which can include many service invocations.

The next step is to use Method Retrieval 340 to retrieve the proper method, which will perform the requested service operation. The Method Retrieval 340 selects one of the methods of the selected service object based on the provided method parameters. The Actor 310 then uses the Method Performer 350 to perform the operation.

The Service Connector can be implemented in Java, C#, or other languages that allow systems to load service objects at run-time based on their names. The Method Retrieval mechanism consists of three steps/trials.

Use the method name and parameter types to find an exact match. For example, a Java implementation would use the mechanism offered by the Class.getMethod( ) method.

Unfortunately the exact match rarely happens in real programs. Parameter types are often subclasses of required argument classes. The second step is to check for method compatibility instead of the exact match. For example, a java implementation would use the mechanism offered by the Class.isAssignableFrom( ) method.

It is possible that both trials will fail because of implementation issues. For example, Personal Digital Assistants (PDA) or wireless phones do not have sufficient library support for such sensitive reflection mechanisms. In this case, the third attempt will invoke a specific method of the service object that serves as the dispatcher for other methods of this service class. For example, it may call a method named "dispatch( )" of that class according to the initial interface/agreement between the Service Connector and service classes. The "dispatch( )" method takes the name of a service operation (a method name) and the array of objects. These objects will be cast into specific types inside the "dispatch( )" method according to the requirements of the specified service method.

The ScenarioPlayer 200 component is responsible for handling agent events. The ScenarioPlayer 200 also provides interpretation and performance of application scenarios, which contain rules for possible events and related handling procedures.

Requested services can be implemented as service components 500 or as knowledgebase rules.

Figure 5:
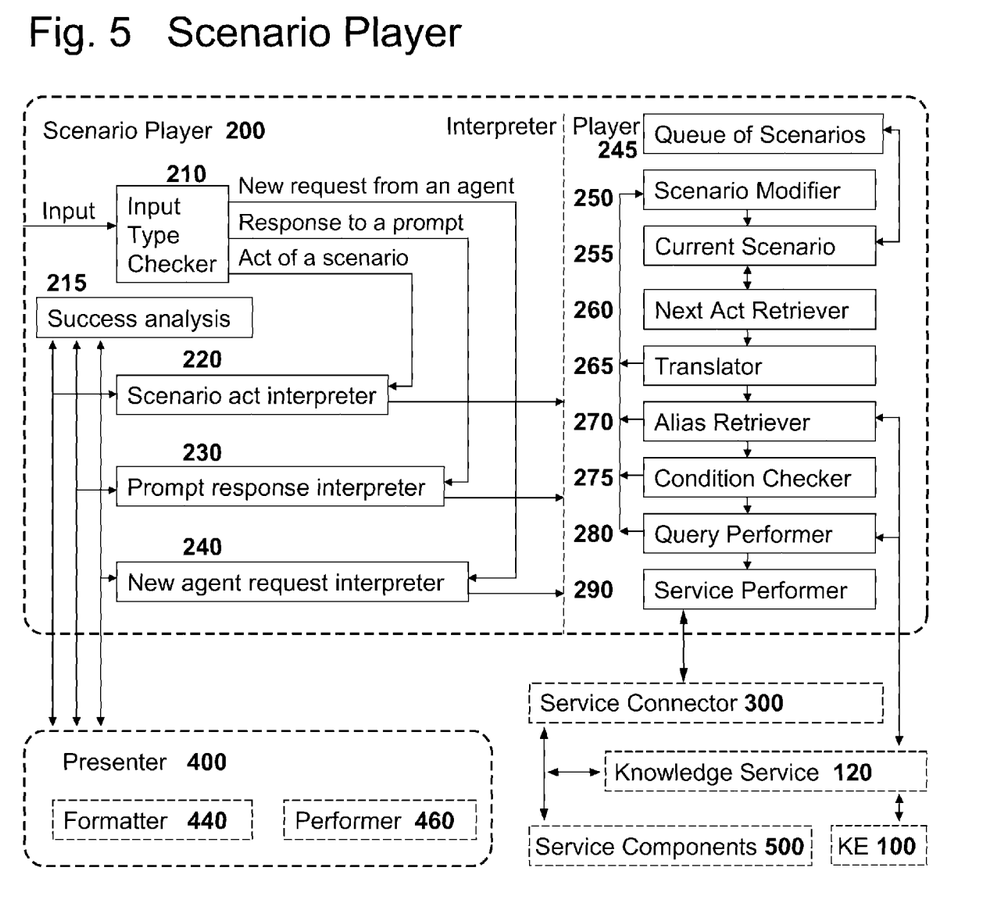
FIG. 5 discloses details of the Scenario Player.

FIG. 5

FIG. 5 discloses details of the Scenario Player 200.

The Scenario Player 200 consists of two major parts: the Interpreter and the Act Player presented in FIG. 5 with blocks 210-240 and 250-290 respectively.

The Input Type Checker 210 checks current input and, depending on its type, submits the input to one of the interpreters.

Knowledge-driven architecture includes elements and mechanisms that provide information about the knowledge and services existing on other istributed knowledge systems built with this architecture. These mechanisms include but are not limited to the Service Analysis 215 component and learning scenarios.

The Success Analysis 215 component provides a history of success, history of interpretation failures, and, in the case of interpretation failure, invokes one of the learning scenarios that prompt an agent (a user or a program) to re-define the input or provide more details for better interpretation. If the learning scenario cannot be executed at that time (it was canceled, etc.), the scenario will be placed in the queue of scenarios with un-answered questions to be played later and to resolve unsuccessful interpretations.

Each service component can have usage and value properties (see Jeff Zhuk, U.S. patent application, Distributed active knowledge and process base, 2010044827, A1, http://uspto.gov). The Success Analysis 215 component re-evaluates these properties after each service request.

The set of interpreters includes but is not limited to the Scenario Act Interpreter 220, the Prompt Response Interpreter 230, and the New Agent Request Interpreter 240.

All interpreters transform original input into scenario player APIs or service component APIs. Interpreters are connected to the Presenter 400 and can use the Formatter 460 and the Performer 440 services. For example, the input line can instruct the system to present information via a specified video or audio format. It is also possible that no current interpretation will be found. In this case, a default learning scenario would be played, prompting an agent (a user or a program) to re-define the input or provide more details. Default scenarios can be replaced at run-time with enhanced ones.

Interpretation rules are stored in the knowledgebase 100. Interpreters interact with the Query Performer 280 to access the knowledgebase 100 via the Knowledge Service 120. When existing rules fail, the learning scenario (default or not) is given the questionable unresolved input, and is called upon to retrieve new definitions or more details from an agent (a user or a program). Upon successful execution, the scenario ends up with one or more acts that re-define existing rules or/and add more rules to the knowledgebase. If the learning scenario cannot be successfully executed at this time, the scenario will be stored in the Queue of Scenarios 245, and will be tried again later. This provides for great flexibility, which is a welcomed feature for most business applications as well as educational systems.

The Player part of the Scenario Player 200 consists of the Queue of Scenarios 245, the Scenario Modifier 250, the Current Scenario 255, the Next Act Retrieval 260, the Translator 265, the Alias Retrieval 270, the Condition Checker 275, the Query Performer 280, and the Service Performer 290.

The Queue of Scenarios 245 stores the current scenario when it cannot be executed at the present time, but needs to be executed later on. For example, if a user cannot provide answers to a learning scenario at this moment, but can do so afterward.

The Scenario Modifier 250 receives results from every step of playing the scenario act. If the current act resolves the value of any variable in the scenario, the Scenario Modifier 250 replaces this variable with its value in the Current Scenario 255. For example, the scenario can include the variable PEER-GROUP-NAME. Any act of the scenario that resolves this variable will pass the variable name and its value to the Scenario Modifier 250, and the Scenario Modifier 250 will replace this variable in the Current Scenario 255 with the value of the variable.

The Current Scenario 255 is loaded from the knowledgebase 100 or from the Queue of Scenarios 245, and can be updated with run-time values by the Scenario Modifier 250. Any current scenario consists of scenario acts: simple XML elements/instructions. Each instruction can be a prompt to an agent (a user or a program) or a service request, including internal and external services.

The Next Act Retrieval 260 retrieves one act of a scenario at a time. This is usually the next act according to the sequence of acts stored in the scenario. The sequence of acts can be changed with conditional statements.

Blocks 265-290 in FIG. 5 can be considered as examples of internal services that are often used in the process of interpreting instructions or as responses to a prompt.

The Translation 260 takes a set of arguments that describe the type of the requested translation. The translate element invokes the Translation 260 block. Here is an example of using the translate element:
<prompt action="prompt"
  service="com.its.connector.ScenarioPlayer"
  variable="PERSON-NAME"
  translate="concatenate(REPLACE-WITH-INPUT)"
  msg="Please provide your name (First Last)"/>

The system will find the concatenate and startWithUpperCase methods in the available translator service components or in the knowledgebase where the action is stored as an executable rule. The action will concatenate a user's input and make sure that each word begins with the upper case. For example, if the input was "jeff zhuk" the first instruction will produce "jeffZhuk" and the second instruction will make it "JeffZhuk".

The Alias Retriever 270 checks for in-line aliases that can be used as the "aliases" element in the current scenario act. For example, the following element would instruct the Alias Retrieval 270 to interpret prompt responses like "Y", "OK", or "Sure" as "Yes".
aliases="Yes|y|ok|sure"

The Alias Retriever 270 can be also invoked when an instruction includes the "inAliases" element that directs the Alias Retrieval 270 to look in the knowledgebase for a set of related aliases as provided in the example below.
<prompt variable="TRAINING-COURSE"
  perform="prompt"
msg="What subject do you want to learn?" inAliases="Java TrainingCourses"/>

The knowledgebase can contain a set of rules/aliases related to course names. For example, entered keywords like "enterprise" or "server" will result in the name "J2EE", while keywords like "PDA" or "wireless" will result in the course name "J2ME".

A found alias, for example, "J2EE", will be passed to the Scenario Modifier 250 to replace the current variable name "TRAINING-COURSE" with its alias value. Otherwise, the variable name will be replaced with the original response.

The Condition Checker 275 is invoked by the "condition" element in a scenario act. The "condition" element is followed by a specified condition, one from the list of conditions, (like "exists", "!exists", "equals", etc., see the list of conditions in the application scenario language) and required arguments.

A conditional statement is usually followed by an action to perform. If a condition is not met (returns false) the action will not be performed, and the next scenario step will be played instead.

For example, a conditional instruction can check if a requested training course exists.
<if condition="!exists" pattern="TRAINING-COURSE"lastMsg="The course is not found. Enter more keywords."/>

Conditional instructions, like "includes", "equals", etc. require two arguments: a pattern and a source.
<if condition="includes" pattern="TRAINING-COURSE"source="XML"
perform="playScenario(XMLTechnologies)"/>

The conditional instruction in the example above will check if a selected training course includes the "XML" keyword. If the condition is true the system will start playing the "XMLTechnology" scenario. Otherwise the next sequential act of the current scenario will be played instead.

The Query Performer 280 is invoked by the query element when it is present in a scenario.
<act queryResult="PASSWORD-QUESTION=PASSWORD-ANSWER"query="passwordOf(USER-NAME)"/>

The query instruction provided in the example above checks in the knowledgebase for a user's record and delivers one of the password questions with its answer. In the current example, knowledgebase records include more than one way to check a user's identity. There may be different password questions as well as password answers, and the knowledgebase would select one or more of them based on some rules established by your requirements.

For example, the question can be as simple as "Password?", or more complicated like "What is your mother's maiden name?", etc. The question is retrieved along with the answer, and both are assigned to proper variable names.

In the case of a successful query, the retrieved value will be passed to the Scenario Modifier 250 to replace the variable name in the current scenario.

The Service Performer 290 is invoked by the action or perform elements at the very end of the execution of an act of a scenario regardless of the order in which the elements of the act were written. Translations, alias retrievals, conditions, and queries, if any, are done before the Service Performer invocation.

The Service Performer 290 transforms the action or perform elements into a set of arguments including a service name, an optional object name (if multiple objects of the same service class are to be used), a service operation name, and a set of parameters. It then passes these arguments to the Service Connector 200, which will access the proper service object and execute the proper service method.

Application Scenario Language

Application Scenario Language (ASL) is an XML-based language that describes application business flow in small scenarios. The scenario language constructs can be changed, improved, and extended; they are here in this form to illustrate the invention. Scenarios consist of XML elements: scenario steps or acts. Every act of a scenario is a prompt, a condition, or an execution step.

Prompt the User or a Partner Program for an Answer

The prompt might have additional arguments, specific rules for input interpretation, and conditional actions.

Here is an extract from the addKnowledge.xml scenario, which allows someone to introduce a new object to the knowledge base.

```
<prompt                         variable="NEW-OBJECT"
    service="com.its.connector.ScenarioPlayer"
action="prompt"noinput="reprompt(Your input is needed)"
translate="concatenate"
msg="Please provide a name for your new topic."/>
<if     condition="!exists"perform="doNextStep(acceptNe-
    wObject)"/>
<act    name="reject"action="query"constant="NEW-OB-
    JECT"
lastMsg="NEW-OBJECT is not new."/>
<act name="acceptNewObject"service="com.its.connector.
    KnowledgeService"
action="createNewPermanent"constant="NEW-OB-
    JECT"/>
```

The prompt element of the scenario will invoke the prompt mechanism (method) of the ScenarioPlayer 200. The prompt ( ) method of the ScenarioPlayer class works with the Presenter 400 component to deliver a prompt message. The method shifts the ScenarioPlayer into the interpretation state. It will interpret the user' response and assign the variable provided with the prompt parameters to the value of the interpretation result.

The prompt element of the XML scenario specifies the service-class name (com.its.connector.ScenarioPlayer) and the action-method name (prompt), and sets the prompt variable (NEW-OBJECT) to store the user's input. One of the most important arguments of the prompt element is the prompt message delivered to the target audience.

The noinput and translate elements are optional interpretation parameters. The noinput element directs the program to re-prompt a user if the user just pressed the ENTER key.

The translate element instructs the program to concatenate multi-word input into a single word that can better serve as a unique reference.

A more complete example of the Application Scenario Language is provided in the attached Attachment 1-Application Scenario Language.

By providing application requirements via business rules with "almost natural" predicate logics, we can take a short-cut past several steps of the traditional development process, where requirements are boiled down to traditional Boolean-logics based programs. The main reason is the difference between programming languages and ontology languages, which can be used to describe business rules. Ontology languages are closer to our natural language, and can express an unlimited number of relationships that can be provided with predicates, while programming languages are extremely limited with their syntax and especially with their set of relationships. The difference between predicate logics and Boolean logics is tremendous. In a way, traditional development translates natural language requirements into Boolean logics. Predicate logics require almost no translation.

In the example below, we use the Cyc language (CycL), by Cyc Corporation, to describe several rules of an educational system. Let us say that the application allows students and instructors to collaborate in a group with multiple roles. A three-dimensional matrix of roles, related access types, and privileges describes access to documents and services (see Jeff Zhuk, U.S. patent application, Distributed active knowledge and process base, 20010044827, A1, http://uspto.gov).

A very powerful and simple Cyc Language constant helps create unlimited hierarchies. The formula below means that every instance of the first collection, GroupMember, is also an instance of the second collection, SystemUser.

(genls GroupMember SystemUser)

In other words, SystemUser is a generalization of GroupMember.

The genls predicate expresses the idea that one collection is subsumed by another.

In the example below we can define a new function that will return the group role of a member.

Here is an example of a definition for the function MemberRoleFn:

(arity MemberRoleFn 2)
(arg1lsa MemberRoleFn User)
(arg2lsa MemberRoleFn Group)
(resultlsa MemberRoleFn GroupRole)

We read this function definition as: the MemberRoleFn function has 2 parameters: user and group. The function returns the specific group role that the user plays in the specified group.

The following example establishes a rule with the implies keyword:

```
(implies
    (and                            (hasMe
mbershipIn ?USER ?GROUP)
        (hasRole ?USER ?GROUP Admin)
        (hasPrivilege ?USER ?GROUP Change
MemberRoles)))
```

This rule says that if a user has membership in a group and the user has the role of an administrator in this group this user has the privilege to change member roles in this group.

"implies", "and", as well as "or", and "not" are important Cyc's logical connectives.

The benefits of using an ontology language versus a programming language become even more impressive when application rules are more complex and have a tendency to change frequently.

Application scenario language allows us to describe business information flow and user or program interactions. Application scenarios complement business rules, providing direct access to application services. Application scenario language constructs describe service and operation names, define data flow conditions and provide interpretation rules for successful business operations. Application scenarios as well as business rules that comprise the application layer can be directly created by business experts, while application services will be created by programmers and can be considered as part of the system layer.

Here is an example of the scenario for an educational system. The scenario allows the system to accept a new object and add this object to the knowledgebase, and provides integration of the new object with existing knowledge.

```
<prompt variable="NEW-OBJECT" perform="prompt"
noinput="reprompt(Your input is needed)"
translate="concatenate"
msg="Please provide a name for your new topic."/>
<if     condition="!exists"perform="doNextStep(acceptNe-
    wObject)"/>
```

```
<act                          action="query"constant="NEW-
   OBJECT"lastMsg="NEW-OBJECT is not new."/>
<act name="acceptNewObject" service="com.its.connector.
   KnowledgeService"
   action="createNewPermanent"        constant="NEW-OB-
   JECT"/>
<prompt          variable="EXISTING-COLLECTION"
   perform="prompt"
msg="Enter an existing topic name that can serve as a parent
   to your new topic."/>
<if      condition="!exists"pattern="EXISTING-COLLEC-
   TION"
perform="reprompt(EXISTING-COLLECTION is            not
   found in the KB.)"/>
<act query="(isa EXISTING-COLLECTION ?X)" queryRe-
   sult ="COLLECTION-QUERY-RESULT"/>
<if       condition="!includes"       pattern="Collection"
   perform="reprompt(EXISTING-COLLECTION is not a
   Collection)"/>
<act lastMsg="NEW-OBJECT is integrated in the knowl-
   edgebase"/>
```

The example above prompts a user to provide an existing collection name that would relate a new subject to existing data. The following statements check if the user's input is worth trusting.

Does this parent name really exist in the knowledgebase, or just in the user's imagination? Does this name meet the requirement to be a collection? (Not every existing object can be a parent. Only Collection type objects can.) This short scenario written by business expert can be easily extended or complemented by other scenarios without a programmer's participation.

Examples of the constructs of the Application Scenario Language are provided in the attached document titled "Attachment 1—Application Scenario Language".

The invention claimed is:

1. Knowledge-driven architecture control system that combines hardware and software components and services including audio and video systems, input transformation components and distributed networks, comprising:
   (i) Knowledgebase comprising semantic-enabled rules engine component, containing business domain ontology and business rules, and application scenarios that reflect application requirements;
   (ii) ApplicationScenario Player capable of transforming acts of scenarios and business rules into interactions with knowledgebase, presentation components, and the underlying application services;
   (iii) ServiceConnector transforms service requests from application scenario acts into direct calls to service components, wherein the Service connector comprising (a) Object Retrieval that is able to find an existing service object or load the requested service class and instantiate the object at run-time (b) Object Registry that associates service objects with service and object names, stores service objects, and makes them reusable (c) Method Retrieval that retrieves the proper service method belonging to a selected service object based on the provided method arguments (d) Method Performer that performs the requested service operation on the selected service object;
   (iv) Service components comprising integration-ready components with separate APIs required by the Service-Connector;
   (v) Presenter comprising (a) Formatter that prepares data for audio or video interaction or for communication to other programs and passes data further to (b) Performer that uses formatted data for actual presentation to one or more agents via voice or screen or electronic formats for different types of agent devices;
wherein the knowledge-driven architecture control system comprising:
the ScenarioPlayer receives an XML instruction from the network, as an act of a current scenario, or a user's input related to the scenario, analyses successful scenario execution including: a) history of successes b) history of interpretation failures c) learning scenarios that prompt an agent, a user, or a program to redefine the input, or to provide more details for better interpretation d) queue of scenarios with un-answered questions to resolve unsuccessful interpretations, upon successful execution, the ScenarioPlayer accesses the Knowledgebase to interpret the input and translate said input into a service request directed to the ServiceConnector; the ServiceConnector accepts service and action names as parameters and connects to or obtain a necessary service object that will perform the requested operation/method, wherein the service object invokes required method and parameters, and delivers results back to the ScenarioPlayer; the ScenarioPlayer gets the results of the service object, and passes the results to the Formatter wherein the Formatter translates the results into a presentation format and produces XML scenarios related to the expected user interaction; and the ScenarioPlayer interprets the results for the Performer object, wherein the Performer object presents results on a screen or/and in a voice format.

2. The Knowledge-driven architecture control system of claim 1, further comprising: input transformation hardware and software components, comprising optical and mechanical speech, handwriting, and image recognition components; wherein said input transformation components are connected and interact to the knowledgebase component filled with expected patterns and recognition scenarios and rules which provide transformation of multiple input types into traditional text and numeric variable values expected by event handling scenarios.

3. The Knowledge-driven architecture control system of claim 1, wherein the knowledgebase component further comprising a service adapter to the knowledgebase, providing a standard service interface required by the ServiceConnector, which interacts with the knowledgebase as with a set of services and a knowledge engine.

4. The Knowledge-driven architecture control system of claim 1, further comprising the Optimizer component wherein the Optimizer takes a snapshot of existing rules and scenarios and translates them into a source code comprising java and C## languages, which can later be compiled into binary code to fix the current application rules into a regular application.

5. The Knowledge-driven architecture control system of claim 1, wherein service components are endowed with usage and value properties.

6. The Knowledge-driven architecture control system of claim 5, wherein the Success Analysis component maintains and consistently refines a list of previously used services with their APIs, keywords, descriptions, and related scenarios in the knowledgebase, and re-evaluates the usage and value properties of the services.

7. The Knowledge-driven architecture control system of claim 1, wherein the New Agent Request interpreter uses the list of previously used services with their APIs, keywords, descriptions, and related scenarios for automatic translation of user requests into service APIs and scenario acts.

8. The Knowledge-driven architecture control system of claim 1, wherein the New Agent Request interpreter uses a list of previously used services with their APIs, keywords, descriptions, and related scenarios to offer selected parts of this information to the user for semi-automatic translation of new requests into service APIs and scenario acts.

9. The Knowledge-driven architecture control system of claim 1, further comprising a Communicator that provides collaborative access to knowledge and services existing on other distributed network systems built with this architecture.

10. The Knowledge-driven architecture control system of claim 6, wherein the Success Analysis component propagates via the Communicator to distributed network systems information on a new service API or a new knowledge subject after the first success operation that included the service or the knowledge subject and then after each update provided locally by the Success Analysis component.

11. The Knowledge-driven architecture control system of claim 10, wherein information on new elements is propagated after the first successful operation that included the new element and thereafter after each local update of such information by the Success Analysis component.

* * * * *